(12) United States Patent
Kippel et al.

(10) Patent No.: US 10,662,839 B2
(45) Date of Patent: May 26, 2020

(54) EXHAUST STACK ASSEMBLIES WITH ACOUSTIC ATTENUATION FEATURES

(71) Applicant: General Electric Company, Schenectady, NY (US)

(72) Inventors: Bradly Aaron Kippel, Greenville, SC (US); Matthew Alan Johnsen, Simpsonville, SC (US); Richard Lynn Loud, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 15/635,317

(22) Filed: Jun. 28, 2017

(65) Prior Publication Data
US 2019/0003358 A1   Jan. 3, 2019

(51) Int. Cl.
*F01N 1/24* (2006.01)
*F02C 3/04* (2006.01)
*F01D 25/30* (2006.01)

(52) U.S. Cl.
CPC .............. *F01N 1/24* (2013.01); *F01D 25/30* (2013.01); *F02C 3/04* (2013.01); *F05D 2260/96* (2013.01); *F05D 2300/6034* (2013.01)

(58) Field of Classification Search
CPC ........ F01N 1/24; F01D 25/30; F05D 2260/96; F05D 2300/6034; F02C 3/04
USPC ................................ 181/213, 222, 224, 292
See application file for complete search history.

(56) References Cited

U.S. PATENT DOCUMENTS

| | | | |
|---|---|---|---|
| 3,762,498 A | | 10/1973 | May et al. |
| 4,128,769 A | * | 12/1978 | Bons ....................... F01D 25/30 181/213 |
| 4,753,319 A | * | 6/1988 | Vinciguerra ............ F01D 25/30 181/218 |
| 5,532,439 A | * | 7/1996 | Minkin ..................... F01N 1/10 181/224 |
| 6,056,084 A | * | 5/2000 | Schockemoehl ....... F01D 25/30 181/224 |

(Continued)

FOREIGN PATENT DOCUMENTS

EP    1006313 A2    6/2000

OTHER PUBLICATIONS

Swanekamp, Exhaust-stack ceramic fiber modules take heat, Power, Nov./Dec. 2000 Issue.

(Continued)

*Primary Examiner* — Jeremy A Luks
(74) *Attorney, Agent, or Firm* — Dority & Manning, P.A.

(57) ABSTRACT

An exhaust stack assembly includes an exhaust stack having an internal surface that defines an interior of the exhaust stack. The exhaust stack is configured to receive exhaust gas from at least one turbomachine component and exhaust the exhaust gas to atmosphere. The exhaust gas assembly further includes a plurality of attenuation assemblies disposed in the interior, each of the plurality of attenuation assemblies including a base substrate generally oriented in the direction of flow of the exhaust gas through the interior, each of the plurality of attenuation assemblies further including a plurality of attenuation modules mounted to the base substrate. Each of the plurality of attenuation modules includes a fiber mesh. The fiber mesh is exposed to the exhaust gas in the interior.

19 Claims, 4 Drawing Sheets

(56) References Cited

U.S. PATENT DOCUMENTS

| | | | | |
|---|---|---|---|---|
| 6,263,998 B1* | 7/2001 | Schockemoehl | ....... | F01D 25/30 181/224 |
| 6,332,511 B1* | 12/2001 | Parlato | ................... | F01N 1/085 181/252 |
| 7,100,356 B2* | 9/2006 | Han | ....................... | F01D 25/30 122/7 R |
| 8,230,967 B2* | 7/2012 | Merchant | ................ | F01D 25/30 181/213 |
| 8,240,427 B2* | 8/2012 | Jangili | ................... | F01D 25/30 181/222 |
| 8,459,407 B2* | 6/2013 | Jangili | ................... | F01D 25/30 181/213 |

OTHER PUBLICATIONS

Pyro-Bloc HS Module, Thermal Ceramics, Morgan Advanced Materials, Datasheet Code US: 5-14-504, 2013.
Lucas, The Reduction of Low Frequency Gas Turbine Exhaust Noise—A Case Study, The American Society of Mechanical Engineers, Presented at the International Gas Turbine and Aeroengine Congress & Exhibition Birmingham, UK Jun. 10-13, 1996.

* cited by examiner

EXHAUST STACK ASSEMBLIES WITH ACOUSTIC ATTENUATION FEATURES

FIELD OF THE DISCLOSURE

The disclosure relates generally to exhaust stacks and turbomachines, and more specifically to systems and devices for attenuating undesirable noise propagation from turbomachine exhaust stacks.

BACKGROUND OF THE DISCLOSURE

Power plant systems generally generate loud sounds during operation. The sound may be emitted from many different parts of the power plant. It is often necessary to attenuate, or reduce, the sound produced from power plant systems. If such attenuation is not initially done well, costly post installation mitigations solutions may be required.

Acceptable outdoor sound levels are generally specified by local noise ordinances or other government codes, which almost always use the A-weighted noise level (dBA) as their metric. In some cases, regulatory agencies may also impose project specific noise conditions on the basis of community reaction and for maintaining an appropriate acoustic environment at the project vicinity. In the absence of a local noise ordinance, county or state laws or codes or those of a similar community may be used. Even if activity noise levels do not exceed those specified by an ordinance, community acceptance is not assured. Very low ambient levels or a noise source with an often-repeated, time-varying characteristic or strong tonal content may increase the likelihood of complaints.

The exhaust stack is often a primary noise source in gas turbine power plants. Silencers in the simple cycle stack, bypass stack and/or in the heat recovery steam generator (HRSG) are typically used to mitigate noise caused by the gas turbine exhaust stream. Stack and HRSG construction can require casing thickness to be increased or cladding with perforated sheet, metal mesh, insulation, and needle-mat to be incorporated to help decrease airborne noise. For simple cycle plants, the exhaust system cost can range from $300,000 to over $1 million, depending on performance and access requirements. Should the stack or HRSG be deemed the dominant noise source during compliance testing and additional mitigation is required, retrofitting the mitigation can be extremely expensive and challenging. Additional foundations may be required if additional silencing is needed.

Current exhaust stacks may utilize a perforated internal sheet layered with a metal mesh and/or acoustic cloth to shield and contain the acoustic insulation material within a stack wall and/or silencer panel for attenuating undesirable noise. The perforated sheet, metal mesh, and acoustic cloth allow only a portion of the sound into the acoustic insulation and reflect the remainder of the sound back into the exhaust stream. This reflection limits the effectiveness of the acoustic insulation material, resulting in the need for more silencing length (L) or additional stages of silencers to achieve the desired acoustic attenuation.

BRIEF DESCRIPTION OF THE DISCLOSURE

Aspects and advantages of the disclosure will be set forth in part in the following description, or may be obvious from the description, or may be learned through practice of the disclosure.

In accordance with one embodiment, an exhaust stack assembly is provided. The exhaust stack assembly includes an exhaust stack having an internal surface that defines an interior of the exhaust stack. The exhaust stack is configured to receive exhaust gas from at least one turbomachine component and exhaust the exhaust gas to atmosphere. The exhaust gas assembly further includes a plurality of attenuation assemblies disposed in the interior, each of the plurality of attenuation assemblies including a base substrate generally oriented in the direction of flow of the exhaust gas through the interior, each of the plurality of attenuation assemblies further including a plurality of attenuation modules mounted to the base substrate. Each of the plurality of attenuation modules includes a fiber mesh. The fiber mesh is exposed to the exhaust gas in the interior.

In accordance with another embodiment, a power plant is provided. The power plant includes a compressor, a combustor, a turbine, and an exhaust stack connected to the turbine. The exhaust stack has an internal surface that defines an interior of the exhaust stack. The exhaust stack is configured to receive exhaust gas from the turbine and exhaust the exhaust gas to atmosphere. The power plant further includes a plurality of attenuation assemblies disposed in the interior, each of the plurality of attenuation assemblies including a base substrate generally oriented in the direction of flow of the exhaust gas through the interior, each of the plurality of attenuation assemblies further including a plurality of attenuation modules mounted to the base substrate. Each of the plurality of attenuation modules includes a fiber mesh. The fiber mesh is exposed to the exhaust gas in the interior.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
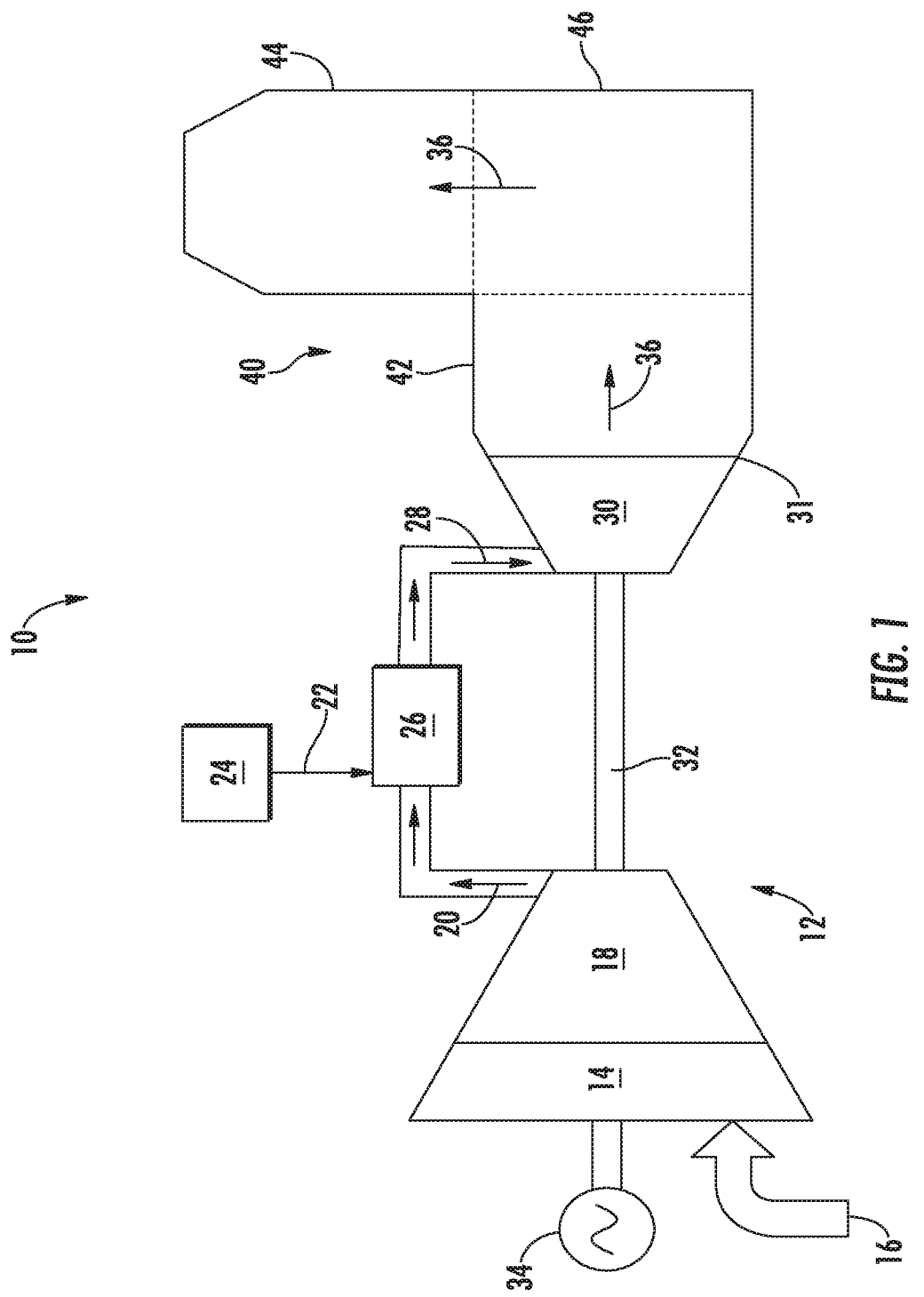
FIG. 1 is a schematic of a power plant in accordance with embodiments of the present disclosure.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow. The term "circumferentially" refers to a relative direction that extends around an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine including but not limited to an aero-derivative turbine, marine gas turbine as well as a heavy duty gas turbine, unless specifically recited in the claims.

Referring now to the drawings, wherein identical numerals indicate the same elements throughout the figures, FIG. 1 provides a functional block diagram of an exemplary power plant 10 that may incorporate various embodiments of the present invention. As shown, the power plant 10 generally includes a gas turbine 12 having an inlet section 14 that may include a series of filters, cooling coils, moisture separators, and/or other devices to purify and otherwise condition a working fluid (e.g., air) 16 entering the gas turbine 12. In operation, the working fluid 16 flows through the inlet section 14 and into a compressor 18. The compressor 18 progressively imparts kinetic energy to the working fluid 16 to produce a compressed working fluid 20 at a highly energized state.

The compressed working fluid 20 is mixed with a fuel 22 from a fuel supply system 24 to form a combustible mixture within one or more combustors 26 of the gas turbine 12. The combustible mixture is burned to produce combustion gases 28 having a high temperature and pressure. The combustion gases 28 flow through a turbine 30 of the gas turbine 12 to produce work. For example, the turbine 30 may be connected to a shaft 32 so that rotation of the turbine 30 drives the compressor 18 to produce the compressed working fluid 20. Alternately or in addition, the shaft 32 may connect the turbine 30 to a generator 34 for producing electricity.

Exhaust gases 36 from the turbine 30 flow through an exhaust stack 40 that connects, either directly or indirectly, to the turbine 30. Exhaust stack 40 is thus disposed downstream from an outlet 31 of the turbine 30. In some embodiments, a heat recovery system may be disposed downstream from the turbine outlet 31 and upstream from the exhaust stack 40, i.e. between the outlet 31 and stack 40. The heat recovery system may include various heat exchangers, exhaust scrubbers and/or other components (not shown) for extracting additional heat from and/or cleaning or scrubbing the exhaust gases 36 prior to release to the environment.

Figure 2:
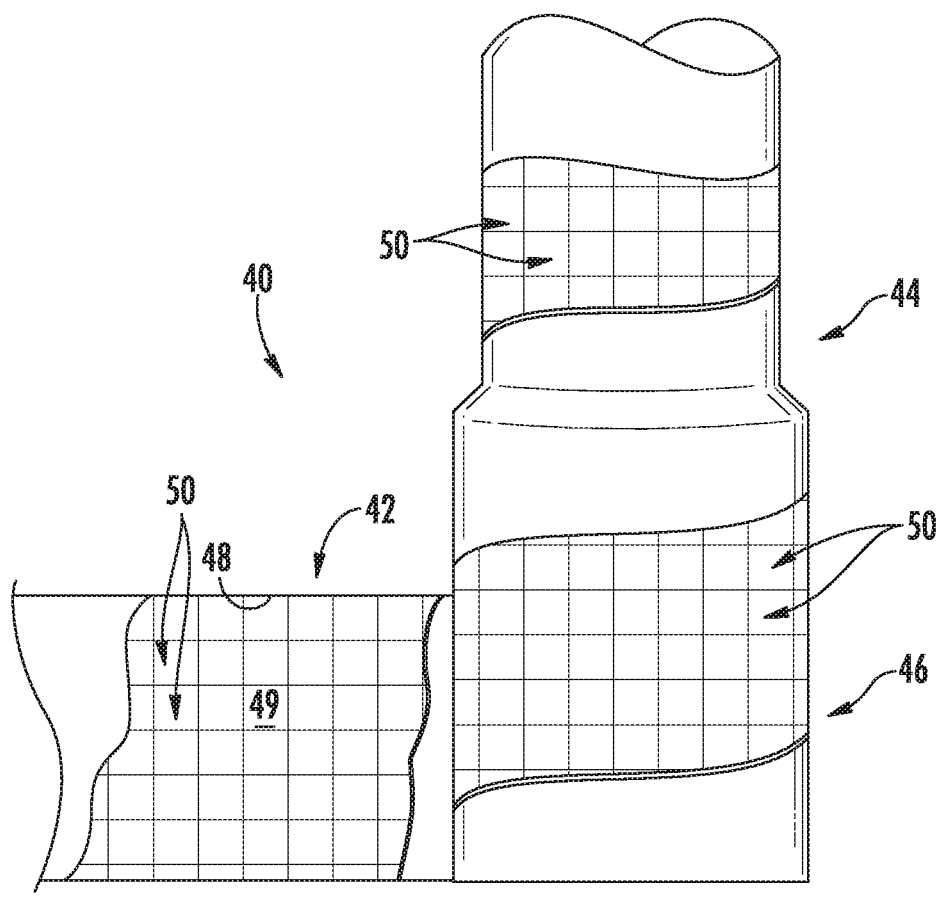
FIG. 2 is a side view of an exhaust stack, with cut-aways illustrating attenuation assemblies disposed therein, in accordance with embodiments of the present disclosure.

Referring now additionally to FIG. 2, exhaust stack 40 may include one or more components, such as a horizontal portion 42 through which exhaust gases 36 flow generally horizontally, a vertical portion 44 through which exhaust gases 36 flow generally vertically, and/or a transition portion 46 through which exhaust gases 36 are transitioned from generally horizontal to generally vertical flow. The generally, exhaust stack 40 (such as the one or more components 42, 44, 46 thereof) may include an internal surface 48 which defines an interior 49 of the exhaust stack 40.

The exhaust gases 36 create high levels of generally low to mid-frequency noise as they pass through the exhaust stack 40. In order to attenuate this noise, attenuating assemblies 50 may be disposed within the flow of exhaust gases 36 at various locations within the exhaust stack 40.

Figure 5:
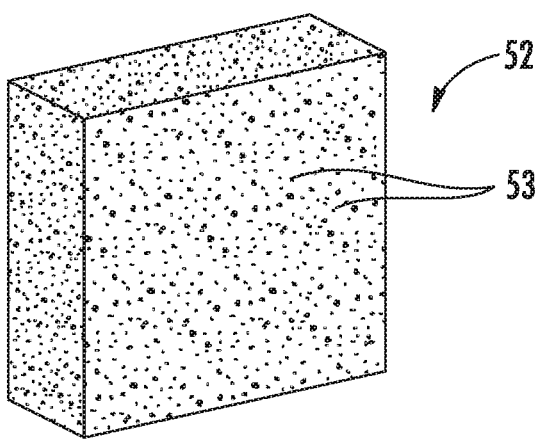
FIG. 5 is a perspective view of an attenuation module in accordance with embodiments of the present disclosure.

Each attenuation assembly 50 may include a plurality of attenuation modules 52. Referring now to FIG. 5, an attenuation module 52 is generally formed from a fiber mesh which includes a plurality of fibers 53. The attenuation modules 52 attenuate undesirable sound emanating the exhaust stack 40. Advantageously, the attenuation modules 52 have no protective cover, perforated sheet or acoustic cloth/mesh wrap found in typical turbomachine exhaust stacks. To the contrary, the fiber mesh and thus fibers 53 of the fiber mesh are exposed within the interior 49 and exposed to the exhaust gases 36 flowing through the interior 49. Due to use of a fiber mesh, attenuation modules 52 maintain their structural integrity without requiring a perforated internal sheet or other sound-reflecting structure between the attenuation modules 52 and the exhaust gas 36 to shield the modules 52 from erosion by the exhaust gas. Therefore, the modules 52 and assemblies 50 generally provide more effective silencing per linear foot of exhaust stack internal surface 48 relative to known attenuation designs, and in some cases resulting in the ability to remove or reduce other exhaust silencers in the turbomachine equipment and/or reduce the total height of the exhaust stack. Other benefits of the modules 52 and assemblies 50 generally may include lower initial cost, lower airside pressure drop through the exhaust stack, easier replacement of damaged attenuation modules 52 and assemblies 50 generally during maintenance outages, and lower mass to be supported by foundations and/or support steel.

The fibers 53 may have properties that can be tuned by adjusting the length, diameter, and orientation of the fibers 53, thereby optimizing the acoustic attenuation required to absorb the undesirable sound. The fibers 53 may be oriented in a parallel pattern, perpendicular pattern, crisscross pattern, diagonal pattern or mixtures thereof, relative to the exhaust gas 36 flow direction. The fiber diameter and/or length may be uniform or mixed to further tune the acoustic properties of the attenuation modules 52 and assemblies 50 generally.

Turbomachine exhaust gas temperatures can exceed 2000 degrees Fahrenheit and can contain many corrosive combustion byproducts, thereby making the fiber 53 materials the best selection for reliability and durability. In some embodiments, the fiber 53 diameters can be between 0.5 and 10 microns. In some embodiments, the fibers 53 can be one or more of ceramic fibers (which in some embodiments are refractory ceramic fibers), alkaline earth silicate (AES)

fibers, or polycrystalline wool fibers. In some embodiments, the density of the attenuation modules 52 may be between 2 and 20 pounds per cubic foot. In some embodiments, the attenuation module 52 airflow resistivity, as determined per ASTM C522 (2016 version), can be between 10,000 MKS Rayls/m (Pascals/s/m$^2$) and 20,000 MKS Rayls/m, such as between 5,000 MKS Rayls/m and 60,000 MKS Rayls/m. In some embodiments, the exhaust gas 36 velocity within stack 40, as determined by the exhaust gas 36 flow rate and cross sectional area of the stack assembly including the stack 40 and the assemblies 50 therein, can be greater than 200 ft/s.

As discussed, each module 52 may be formed from a fiber mesh. The mesh is generally a solid mass of fibers 53. Such construction advantageously minimizes the number of joints, allows for compression of the modules 52 in all directions during installation, and greatly reduces the likelihood of gaps opening up at elevated temperatures. The attenuation modules 52 can be easily cut and modified in the field, enabling installers to trim to fit both concentrically and lengthwise, and to work around structural obstructions. To protect the attenuation modules 52 against the high-velocity turbine exhaust gas 36, the attenuation modules 52 may optionally be coated with a rigidizer to harden the surface of fiber materials.

Figure 3:
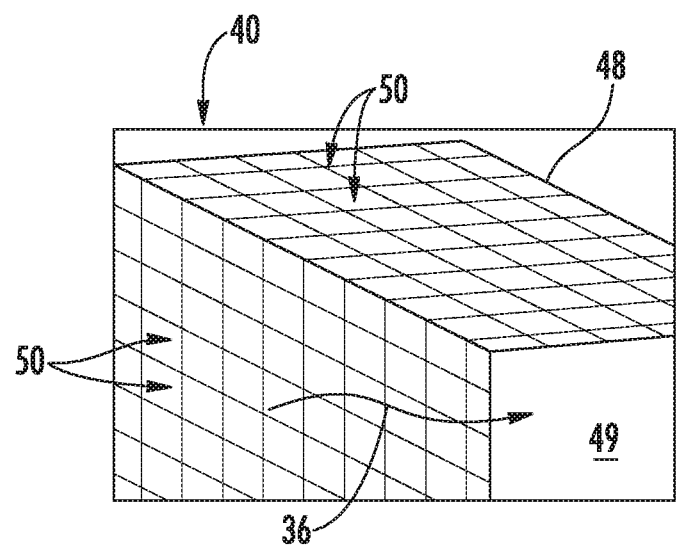
FIG. 3 is a perspective internal view of an exhaust stack assembly in accordance with embodiments of the present disclosure.
Figure 4:
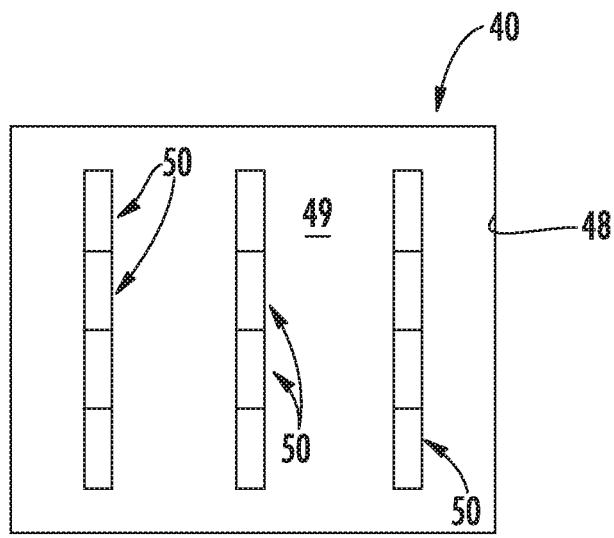
FIG. 4 is a front view of an exhaust stack assembly in accordance with embodiments of the present disclosure.

Referring now to FIGS. 3 and 4, and as discussed, the attenuation assemblies 50 may be disposed within the interior 49 of the exhaust stack 40. In some embodiments, as illustrated in FIG. 3, the attenuation assemblies 50 may be mounted to the internal surface 48. For example, the attenuation modules 52, or a base substrate 54 as discussed herein, may be mounted to the internal surface 48. The attenuation modules 52 may thus be in contact, either directly or indirectly through a mounting substrate or apparatus, to the internal surface 48. In other embodiments, as illustrated in FIG. 4, the attenuation assemblies 50 may be spaced from the internal surface 48, and thus suspended within the interior 49. Mounting arms (not shown) may extend between the attenuation assemblies 50 and the internal surface 48 to support the assemblies 50 in such suspended manner.

The assemblies 50 may be disposed in one or more of the horizontal portion 42, vertical portion 44, and/or transition portion 46. Further, in exemplary embodiments, multiple assemblies 50 may be in contact with one another in the interior 49, forming attenuation arrays of assemblies 50.

Figure 6:
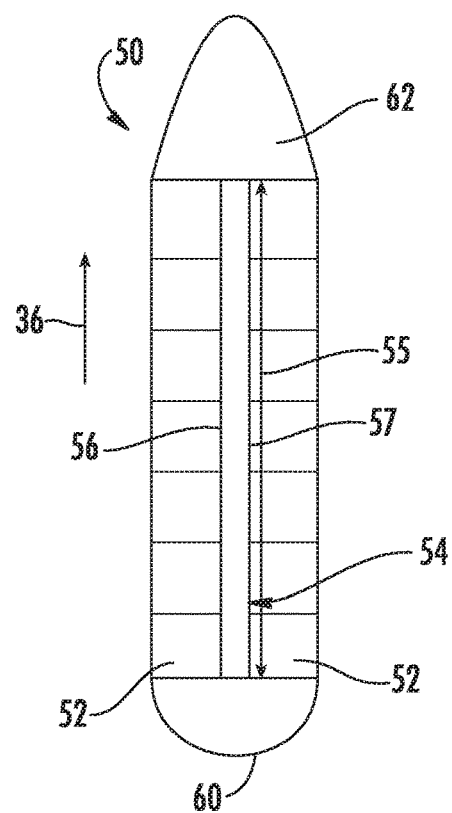
FIG. 6 is a top view of an attenuation assembly in accordance with embodiments of the present disclosure.
Figure 7:
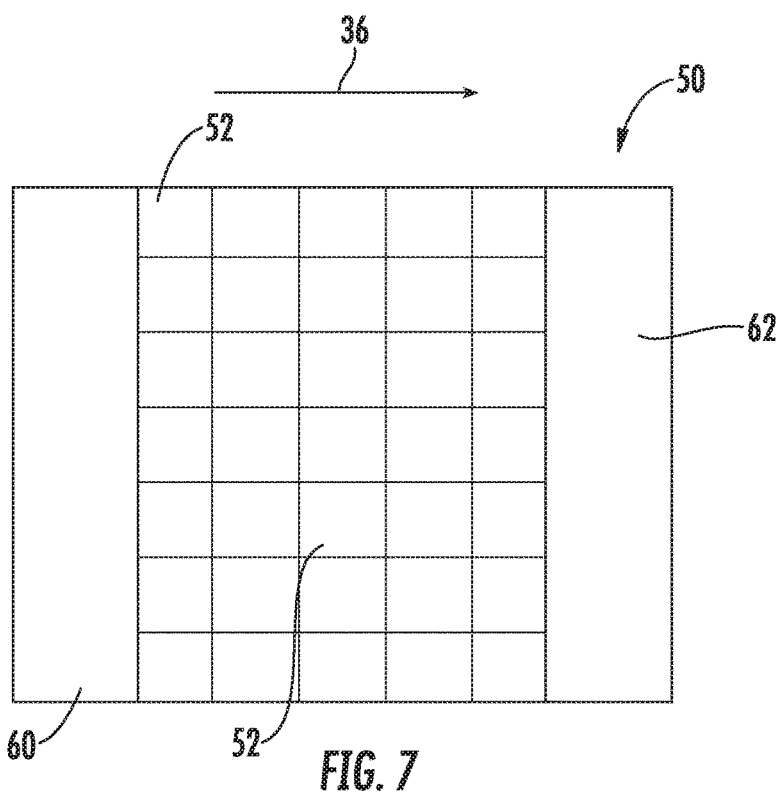
FIG. 7 is a side view of an attenuation assembly in accordance with embodiments of the present disclosure.

Referring now to FIGS. 6 and 7, embodiments of attenuation assemblies 50 in accordance with the present disclosure are illustrated. An attenuation assembly 50 may include one or more attenuation modules 52, such as in exemplary embodiments a plurality of attenuation modules 52, and in some embodiments may further include a base substrate 54. Each attenuation module 52 may be mounted to the base substrate 54. The attenuation modules 52 may thus be in contact, either directly or indirectly through a mounting substrate or apparatus, with the base substrate 54.

Base substrate 54 is, in exemplary embodiments, a plate. Such plate may thus have a rectangular cuboid shape. When positioned in the interior 49, a base substrate 54 may be generally oriented in the direction of flow of the exhaust gases 36 through the interior 49. Accordingly, a largest dimension (i.e. a length 55) of the base substrate 54 may be generally parallel to the direction of flow of the exhaust gases 36 through the interior 49. The base substrate 54 may be formed from any suitable material, and in exemplary embodiments is fiberless (i.e. does not include any fibers 53). In some embodiments, for example, the base substrates 54 may be formed from a metal, such as steel.

Base substrate 54 may include a first face 56 and an opposite second face 57. Attenuation modules 52 may be mounted to one or both of the first and second faces 56, 57.

In some embodiments, the attenuation assembly 50 may further include a head module 60 and/or a tail module 62. The head module 60 may be positioned at a front end of the attenuation assembly 50, such that the head module 60 generally faces the exhaust gas 36 flow. The tail module 62 may be positioned opposite the head module 60. Accordingly, the head module 60 may act as a leading edge of the attenuation assembly 50, and the tail module 62 may act as a trailing edge of the attenuation assembly 50. Any suitable cross-sectional shapes (i.e. as shown in the top view of FIG. 6) may be utilized for the head module 60 and tail module 62. For example, the head module 60 may have a half-circle (as shown), airfoil, triangular, conical, or trapezoidal cross-sectional shape. The tail module 62 may have a half-circle, airfoil, triangular, conical (as shown), or trapezoidal cross-sectional shape. Other suitable cross-sectional shapes may be utilized. In general, the shape of the tail module 62 and head module 60 may advantageously serve to reduce pressure drops as the exhaust gases 36 flow past the attenuation assemblies 50.

In exemplary embodiments, the head module 60 and/or tail module 62 may be formed from the same materials and have the same general structure as the attenuation modules 52, such as discussed above. For example, the head module 60 and/or tail module 62 may be generally formed from a fiber mesh which includes a plurality of fibers 53. Additionally or alternatively, the head module 60 and/or tail module 62 may be formed from any suitable material, and in exemplary embodiments is fiberless (i.e. does not include any fibers 53). In some embodiments, for example, the base substrates 54 may be formed from a metal, such as steel.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An exhaust stack assembly, comprising:
    an exhaust stack having an internal surface that defines an interior of the exhaust stack, the exhaust stack configured to receive exhaust gas from at least one turbomachine component and exhaust the exhaust gas to atmosphere; and
    a plurality of attenuation assemblies disposed within the interior, each attenuation assembly of the plurality of attenuation assemblies is spaced apart from the internal surface and suspended within the interior, each attenuation assembly of the plurality of attenuation assemblies comprising a base substrate generally oriented in the direction of flow of the exhaust gas through the interior, each of the plurality of attenuation assemblies further comprising a plurality of attenuation modules mounted to the base substrate, each of the plurality of attenuation modules comprising a solid mass of fibers, wherein the attenuation modules of the plurality of attenuation modules have no protective cover, whereby the solid mass of fibers of each attenuation module is exposed to the exhaust gas in the interior.

2. The exhaust stack assembly of claim 1, wherein a diameter of fibers in the solid mass of fibers of each of the plurality of attenuation modules is between 0.5 and 10 microns.

3. The exhaust stack assembly of claim 1, wherein fibers in the solid mass of fibers comprise at least one of ceramic fibers, alkaline earth silicate fibers, or polycrystalline wool fibers.

4. The exhaust stack assembly of claim 1, wherein a density of each of the plurality of attenuation modules is between 2 and 20 pounds per cubic foot.

5. The exhaust stack assembly of claim 1, wherein an airflow resistivity of each of the plurality of attenuation modules is between 10,000 and 20,000 MKS Rayls/m.

6. The exhaust stack assembly of claim 1, wherein each of the plurality of attenuation assemblies is mounted to the internal surface.

7. The exhaust stack assembly of claim 1, wherein each of the plurality of attenuation assemblies further comprises a trailing edge module positioned at a downstream end of the attenuation assembly with respect the exhaust gas.

8. The exhaust stack assembly of claim 1, wherein each of the plurality of attenuation assemblies further comprises a leading edge module positioned at an upstream end of the attenuation assembly with respect to the exhaust gas.

9. The exhaust stack assembly of claim 1, wherein the base substrate is a metal plate.

10. The exhaust stack assembly of claim 1, wherein the attenuation assemblies are configured to attenuate sound emanating from the exhaust stack.

11. A power plant, comprising:
a compressor;
a combustor;
a turbine; and
an exhaust stack connected to the turbine, the exhaust stack having an internal surface that defines an interior of the exhaust stack, the exhaust stack configured to receive exhaust gas from the turbine and exhaust the exhaust gas to atmosphere; and
a plurality of attenuation assemblies disposed within the interior, each attenuation assembly of the plurality of attenuation assemblies is spaced apart from the internal surface and suspended within the interior, each attenuation assembly of the plurality of attenuation assemblies comprising a base substrate generally oriented in the direction of flow of the exhaust gas through the interior, each of the plurality of attenuation assemblies further comprising a plurality of attenuation modules mounted to the base substrate, each of the plurality of attenuation modules comprising a solid mass of fibers, wherein the attenuation modules of the plurality of attenuation modules have no protective cover, whereby the solid mass of fibers of each attenuation module is exposed to the exhaust gas in the interior.

12. The power plant of claim 11, wherein a diameter of fibers in the solid mass of fibers of each of the plurality of attenuation modules is between 0.5 and 10 microns.

13. The power plant of claim 11, wherein fibers in the solid mass of fibers comprise at least one of ceramic fibers, alkaline earth silicate fibers, or polycrystalline wool fibers.

14. The power plant of claim 11, wherein a density of each of the plurality of attenuation modules is between 2 and 20 pounds per cubic foot.

15. The power plant of claim 11, wherein an airflow resistivity of each of the plurality of attenuation modules is between 10,000 and 20,000 MKS Rayls/m.

16. The power plant of claim 11, wherein each of the plurality of attenuation assemblies is mounted to the internal surface.

17. The power plant of claim 11, wherein each of the plurality of attenuation assemblies further comprises a trailing edge module positioned at a downstream end of the attenuation assembly with respect the exhaust gas.

18. The power plant of claim 11, wherein each of the plurality of attenuation assemblies further comprises a leading edge module positioned at an upstream end of the attenuation assembly with respect to the exhaust gas.

19. The power plant of claim 11, wherein the base substrate is a metal plate.

* * * * *